(12) United States Patent
Kwak et al.

(10) Patent No.: US 9,745,882 B2
(45) Date of Patent: Aug. 29, 2017

(54) THERMOELECTRIC POWER GENERATION APPARATUS

(71) Applicant: HYUNDAI MOTOR COMPANY, Seoul (KR)

(72) Inventors: Jin Woo Kwak, Gyeongsan-si (KR); In Woong Lyo, Suwon-si (KR); Kyong Hwa Song, Seoul (KR); Hong Kil Baek, Seoul (KR); In Chang Chu, Seoul (KR); Su Jung Noh, Seoul (KR); Seung Woo Lee, Seoul (KR); Han Saem Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 120 days.

(21) Appl. No.: 14/806,581

(22) Filed: Jul. 22, 2015

(65) Prior Publication Data

US 2016/0146084 A1    May 26, 2016

(30) Foreign Application Priority Data

Nov. 26, 2014 (KR) .......................... 10-2014-0166430

(51) Int. Cl.
*F01N 3/02* (2006.01)
*F01N 5/02* (2006.01)

(52) U.S. Cl.
CPC ........ *F01N 5/025* (2013.01); *F01N 2260/024* (2013.01); *Y02T 10/16* (2013.01)

(58) Field of Classification Search
CPC ..... F01N 5/025; F01N 2260/024; Y02T 10/16
See application file for complete search history.

(56) References Cited

U.S. PATENT DOCUMENTS

| 2005/0172992 | A1* | 8/2005 | Shimoji | F01N 5/025 136/208 |
| 2005/0178425 | A1* | 8/2005 | Itoh | F01N 5/025 136/205 |
| 2005/0204733 | A1* | 9/2005 | Sasaki | F01N 3/2013 60/320 |
| 2006/0053771 | A1* | 3/2006 | Murata | F01N 3/2053 60/285 |
| 2011/0146743 | A1* | 6/2011 | Oesterle | F01N 5/025 136/210 |
| 2011/0304004 | A1 | 12/2011 | Park | |

(Continued)

FOREIGN PATENT DOCUMENTS

| JP | 60113677 A | * | 6/1985 |
| JP | S60-113677 A | | 6/1985 |
| JP | 2007-006619 A | | 1/2007 |

(Continued)

*Primary Examiner* — Phutthiwat Wongwian
*Assistant Examiner* — Matthew T Largi
(74) *Attorney, Agent, or Firm* — McDermott Will & Emery LLP

(57) ABSTRACT

A thermoelectric power generation apparatus includes a heat transfer module configured to be attached to an exhaust manifold or an exhaust pipe; a thermoelectric module configured to be supplied with heat from the heat transfer module; and a cooling module configured to absorb heat from the thermoelectric module. Thus, it is possible to implement a thermoelectric power generation system in the vehicle without changing a shape of an exhaust system and a shape of the thermoelectric module.

8 Claims, 5 Drawing Sheets

(56) References Cited

U.S. PATENT DOCUMENTS

2015/0333245 A1* 11/2015 Iriyama .................. F01N 5/025
                                                        136/205
2016/0146083 A1*  5/2016 Lang ....................... H01L 35/30
                                                         60/320

FOREIGN PATENT DOCUMENTS

| JP | 2007006619 A | * | 1/2007 |
| KR | 10-2011-0083415 A | | 7/2011 |
| KR | 10-1062129 B1 | | 9/2011 |
| KR | 10-2012-0038335 A | | 4/2012 |
| KR | 10-2014-0008047 A | | 1/2014 |

* cited by examiner

THERMOELECTRIC POWER GENERATION APPARATUS

CROSS-REFERENCE TO RELATED APPLICATION

This application is based on and claims the benefit of priority to Korean Patent Application No. 10-2014-0166430, filed on Nov. 26, 2014 in the Korean Intellectual Property Office, the disclosure of which is incorporated herein in its entirety by reference.

TECHNICAL FIELD

The present disclosure relates to a thermoelectric power generation apparatus, and more particularly, to a thermoelectric power generation apparatus capable of supplying cooling water to a thermoelectric module while delivering heat from exhaust gas to the thermoelectric module to impart a difference in temperature to a thermoelectric element mounted in the thermoelectric module so as to generate electricity.

BACKGROUND

Generally, an energy quantity discarded through high-temperature exhaust gas from total energy supplied to an internal combustion engine of a vehicle reaches 30% to 40% of the total energy, while an energy quantity used in actual power is only 20% to 30% of the total energy.

Therefore, a technology of recovering energy discarded through the exhaust gas has been developed. In particular, a thermoelectric power generation system for converting the heat from the exhaust gas into electric energy has been developed. The thermoelectric power generation system is configured to use a Seebeck effect which generates power when a difference in temperature is imparted to the thermoelectric element.

However, to mount the thermoelectric module in the existing vehicle, there is a need to change a shape of an exhaust system like extending an exhaust manifold or an exhaust pipe which is a passage of exhaust gas, forming a fin on the inner surface of an exhaust manifold or an exhaust pipe, etc. Further, there is also a need to change a shape of the thermoelectric module to be mounted in the exhaust system.

The change in the shape of the exhaust system may lead to a problem of exhaust pressure and therefore it is difficult to change the shape and the change in the shape of the thermoelectric module leads to reduce operation efficiency of the thermoelectric module.

RELATED ART DOCUMENT

Patent Document (Patent Document 1) Korean Patent Publication No. 10-1062129 (Sep. 2, 2011)

SUMMARY

The present disclosure has been made to solve the above-mentioned problems occurring in the prior art while advantages achieved by the prior art are maintained intact.

An aspect of the present disclosure provides a thermoelectric power generation apparatus capable of being applied to a vehicle without changing a shape of an exhaust system and a shape of a thermoelectric module.

According to an exemplary embodiment of the present disclosure, a thermoelectric power generation apparatus includes: a heat transfer module configured to be attached to an exhaust manifold or an exhaust pipe; a thermoelectric module configured to be supplied with heat from the heat transfer module; and a cooling module configured to absorb heat from the thermoelectric module.

The heat transfer module may include: a heat conductor configured to include a mounting part wound around an outer side of the exhaust manifold or the exhaust pipe and a plate-like extension vertically extending to a longitudinal central axis of the exhaust manifold or the exhaust pipe; and a heat insulator configured to cover the mounting part.

According to another exemplary embodiment of the present disclosure, a thermoelectric power generation apparatus for converting thermal energy of exhaust gas to electricity may include: an exhaust gas passage through which the exhaust gas passes through; a cooling module including a cooling chamber; a heat transfer module including a first portion surrounding the exhaust gas passage and a second portion connected to the first portion and extending radially away from the exhaust gas passage, the heat transfer module extending along a direction parallel to a discharge direction of the exhaust gas; and a thermoelectric module disposed between the cooling chamber and the second portion of the heat transfer module.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
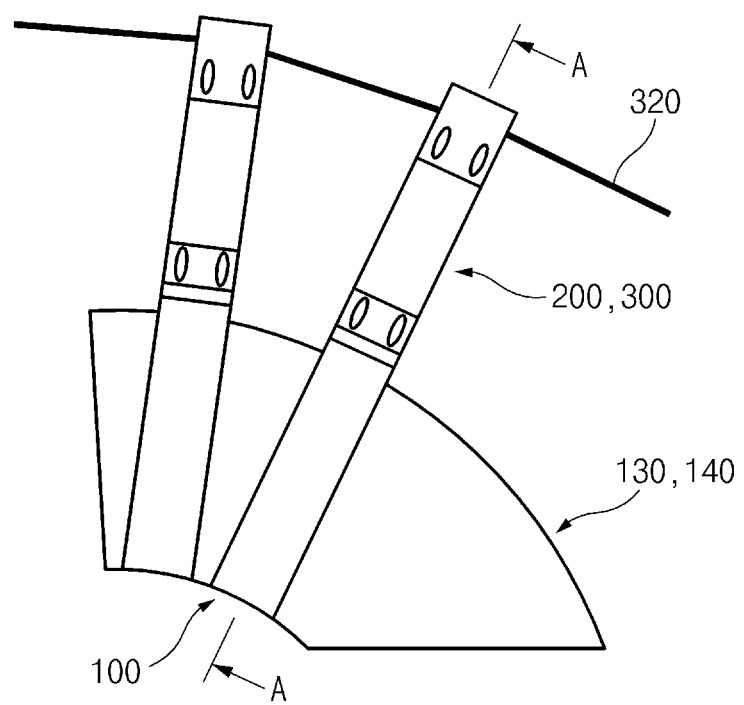
FIG. 1 is an exemplified diagram of a mounting of a thermoelectric power generation apparatus according to an exemplary embodiment of the present disclosure.

Exemplary embodiments of the present disclosure will be described in detail with reference to the accompanying drawings.

As illustrated in FIGS. 1 to 5, a thermoelectric power generation apparatus according to an exemplary embodiment of the present disclosure includes a heat transfer module 100 configured to be attached to an exhaust manifold 130 or an exhaust pipe 140, a thermoelectric module 200 configured to be supplied with heat from the heat transfer module 100, and a cooling module 300 configured to absorb heat from the thermoelectric module 200.

Figure 2:
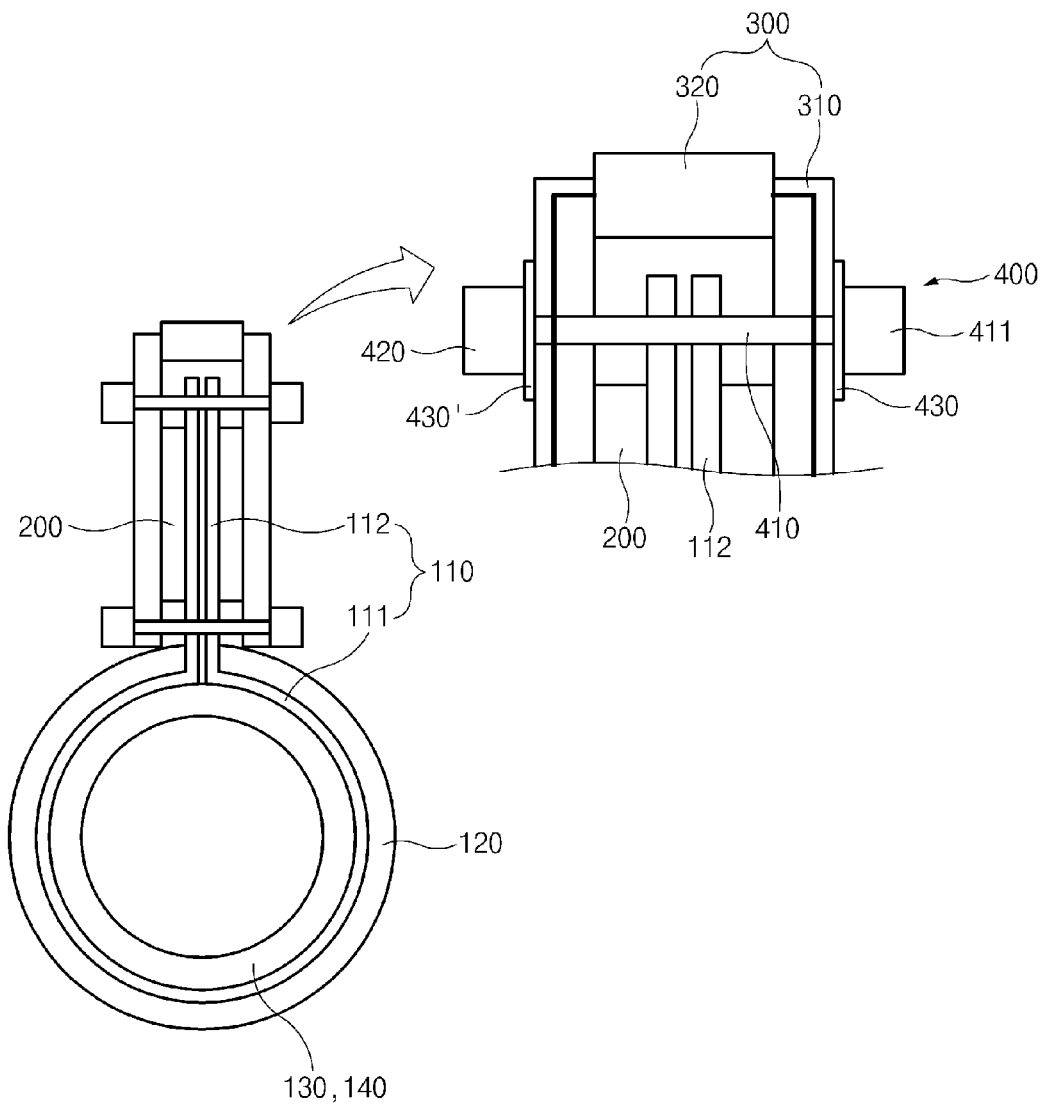
FIG. 2 is a cross-sectional view taken along the line A-A of FIG. 1.

The heat transfer module 100 includes a heat conductor 110 configured to include a mounting part 111 wound around an outer side of the exhaust manifold 130 or the exhaust pipe 140 and a plate-like extension 112 vertically extending to a longitudinal central axis of the exhaust manifold 130 or the exhaust pipe 140 and a heat insulator 120 configured to cover the mounting part 111. As shown in FIG. 2, the plate-like extension 112 protrudes radially away from an outer surface of the exhaust manifold 130 or the exhaust pipe 140, and extends along a direction substantially parallel to the longitudinal central axis of the exhaust manifold 130 or the exhaust pipe 140. The heat conductor 110 is made of a flexible conductor with excellent heat conductivity. According to the exemplary embodiment of the present disclosure, a copper plate is used.

The thermoelectric module 200 includes a semiconductor part in which a P-type semiconductor and an N-type semiconductor are regularly arranged, electrically conducting plates provided on an upper surface and a lower surface of the semiconductor part, respectively, and an electrically insulating part attached to the electrically conducting plate and is manufactured to form a rectangular parallelepiped appearance. The electrically insulating part is preferably made of ceramic.

The cooling module 300 includes a cooling water chamber 310 configured to supply cooling water to cool the thermoelectric module 200. The cooling water chamber 310 is supplied with cooling water from an outside of the cooling module 300 through a cooling water channel 320. As illustrated in FIG. 2, the cooling module 300 is positioned to be horizontal to the extension 112 of the heat transfer module 100 and the thermoelectric module 200 is positioned between the cooling module 300 and the extension 112. Describing in more detail, both surfaces of the extension 112 are each provided with the thermoelectric module 200 and the cooling module 300. The cooling modules 300 which are each positioned on both surfaces of the extension 112 are connected to each other through the cooling water channel 320.

The thermoelectric power generation apparatus according to the exemplary embodiment of the present disclosure further includes a clamp 400 configured to fix the thermoelectric module 200 between the cooling module 300 and the extension 112. The clamp 400 includes a bolt 410 configured to penetrate through the cooling module 300 and the extension 112, a nut 420 configured to be fastened with the bolt 410, and spring washers 430 configured to be positioned at an inner side of a head portion 411 of the bolt 410 and an inner side of the nut 420, respectively.

Despite a change in dimension due to thermal expansion of the exhaust system, the heat transfer module 100, the thermoelectric module 200, or the cooling module 300, the thermoelectric module 200 is prevented from being separated between the cooling module 300 and the extension 112 due to the mounted spring washer 430.

Figure 3:
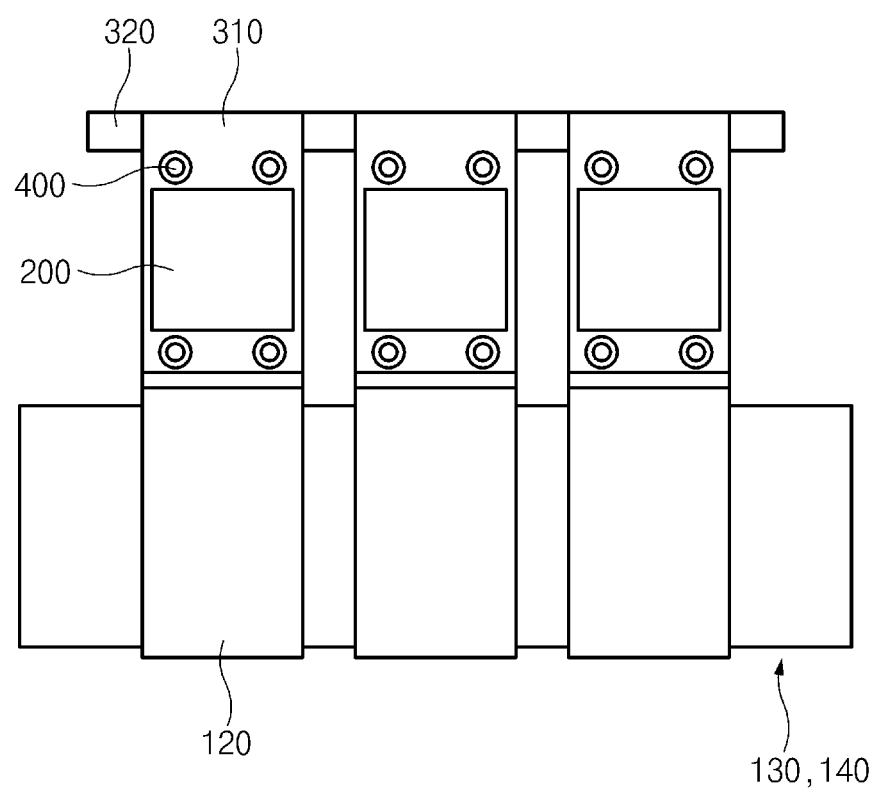
FIG. 3 is another exemplified diagram of the mounting of the thermoelectric power generation apparatus of FIG. 1.
Figure 4:
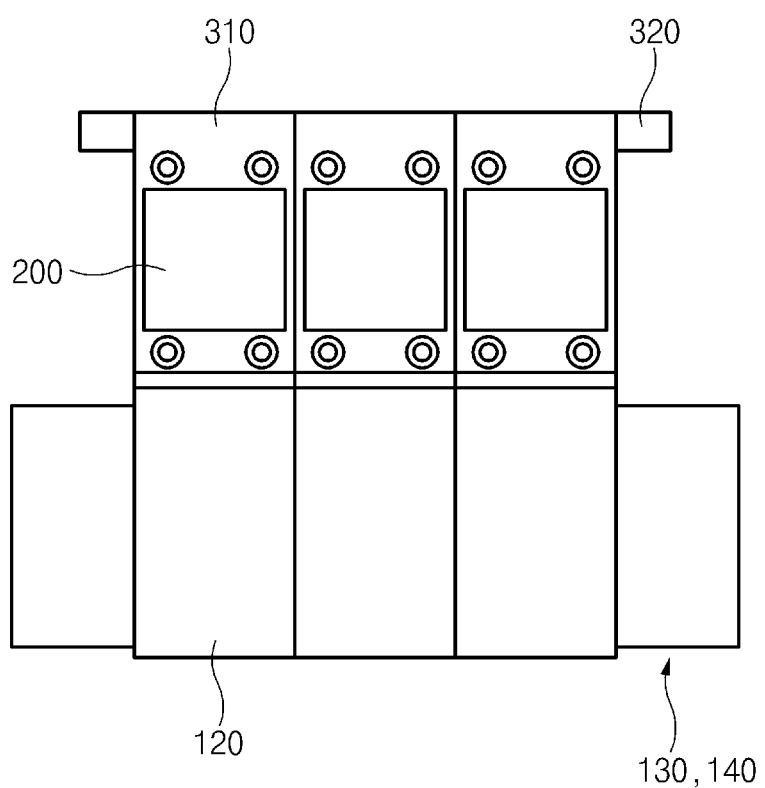
FIG. 4 is still another exemplified diagram of the mounting of the thermoelectric power generation apparatus of FIG. 1.
Figure 5:
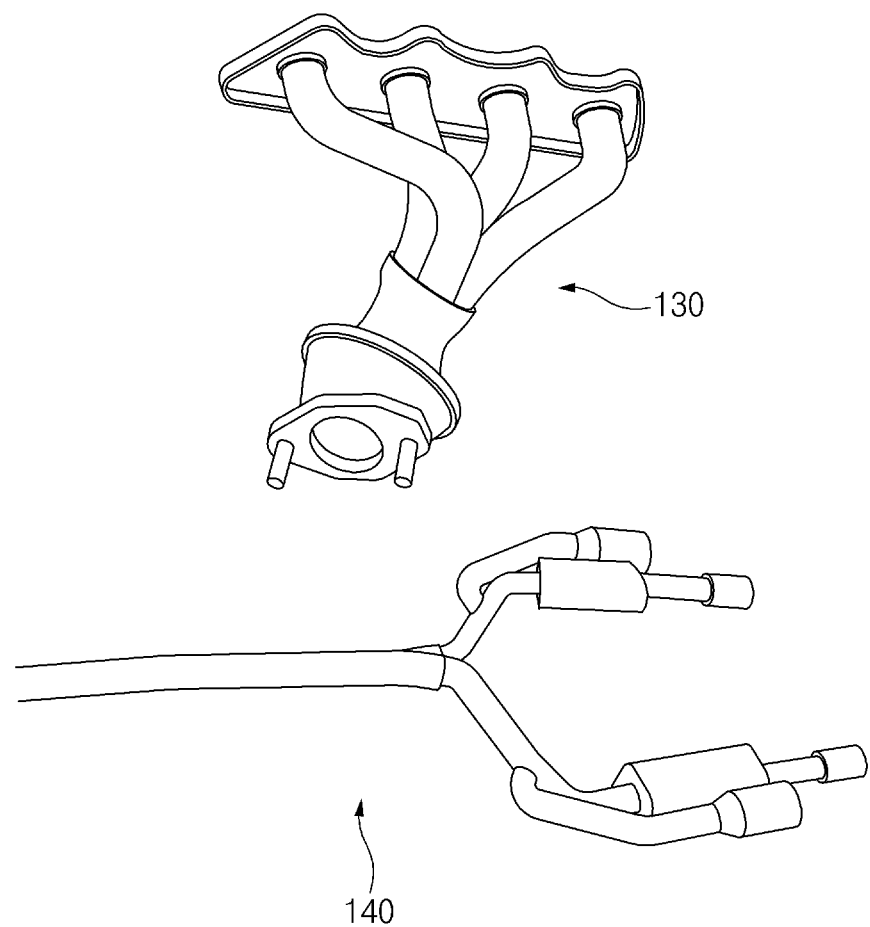
FIG. 5 is an exemplified diagram of an exhaust system in which the thermoelectric power generation apparatus of FIG. 1 is mounted.

The plurality of thermoelectric power generation apparatuses according to the exemplary embodiment of the present disclosure configured as described above are mounted in the exhaust system as illustrated in FIG. 5, thereby implementing the thermoelectric power generation system of the vehicle. In this case, as illustrated in FIG. 3 or 4, distances between the plurality of thermoelectric power generation apparatuses are different or the width of the thermoelectric power generation apparatus is reduced, and thus the thermoelectric power generation apparatus may be mounted even at the geometrically bent portion.

Further, when the thermoelectric element positioned inside the thermoelectric module 200, that is, the semiconductor part is damaged, the specific thermoelectric module 200 in which the semiconductor part is damaged or only the thermoelectric power generation apparatus is replaced and thus a failure of the thermoelectric power generation apparatus may be repaired.

As described above, according to the thermoelectric power generation apparatus in accordance with the exemplary embodiments of the present disclosure, it is possible to implement the thermoelectric power generation system in the vehicle without changing the shape of the exhaust system and the shape of the thermoelectric module.

Further, the heat conductor mounted in the heat transfer module may be manufactured in the thin film, and thus the weight reduction of the heat transfer module may be implemented.

Further, the heat transfer module may be mounted even at a portion with a sharp bend like the exhaust manifold while the width of the heat transfer module is reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A thermoelectric power generation apparatus mounted in an exhaust system of a vehicle, comprising:
   a heat transfer module including a heat conductor configured to have a mounting part wound around an outer side of an exhaust manifold or an exhaust pipe and a plate-like extension vertically extending to a longitudinal central axis of the exhaust manifold or the exhaust pipe;
   a thermoelectric module including a semiconductor part having a P-type semiconductor and an N-type semiconductor, the thermoelectric module positioned between the cooling module and the plate-like extension;
   a cooling module including a cooling water chamber configured to supply cooling water to cool the thermoelectric module, and a cooling water channel configured to supply cooling water to the cooling water chamber; and
   a clamp configured to fix the thermoelectric module between the cooling module and the plate-like extension,
   wherein the clamp includes:
     a bolt penetrating through the cooling module and the plate-like extension;
     a nut fastened with the bolt; and
     spring washers positioned at an inner side of a head portion of the bolt and an inner side of the nut, respectively.

2. The thermoelectric power generation apparatus according to claim 1, wherein the heat transfer module further includes:
   a heat insulator configured to cover the mounting part.

3. The thermoelectric power generation apparatus according to claim 1, wherein the cooling module is positioned to be horizontal to the plate-like extension, and
   the thermoelectric module is positioned between the cooling module and the plate-like extension.

4. The thermoelectric power generation apparatus according to claim 3, wherein the thermoelectric module and the cooling module are positioned on both surfaces of the plate-like extension, respectively.

5. The thermoelectric power generation apparatus according to claim 4, wherein insides of the cooling modules which are positioned on both surfaces of the plate-like extension, respectively, are connected to each other.

6. The thermoelectric power generation apparatus according to claim 5, wherein
the cooling modules which are positioned on both surface of the plate-like extension, respectively, are connected to each other through the cooling water channel.

7. A thermoelectric power generation apparatus for converting thermal energy of exhaust gas to electricity, the apparatus comprising:
an exhaust gas passage through which the exhaust gas passes through;
a cooling module including a cooling chamber;
a heat transfer module including a first portion surrounding the exhaust gas passage and a second portion connected to the first portion and extending radially away from the exhaust gas passage, the heat transfer module extending along a direction parallel to a discharge direction of the exhaust gas;
a thermoelectric module including a P-type semiconductor and an N-type semiconductor, the thermoelectric module disposed between the cooling chamber and the second portion of the heat transfer module; and
a clamp configured to fix the thermoelectric module between the cooling module and the plate-like extension,
wherein the clamp includes:
a bolt penetrating through the cooling module and the plate-like extension;
a nut fastened with the bolt; and
spring washers positioned at an inner side of a head portion of the bolt and an inner side of the nut, respectively.

8. The thermoelectric power generation apparatus according to claim 7, wherein the exhaust gas passage is one of an exhaust manifold and an exhaust pipe of a vehicle.

* * * * *